Figure 1:
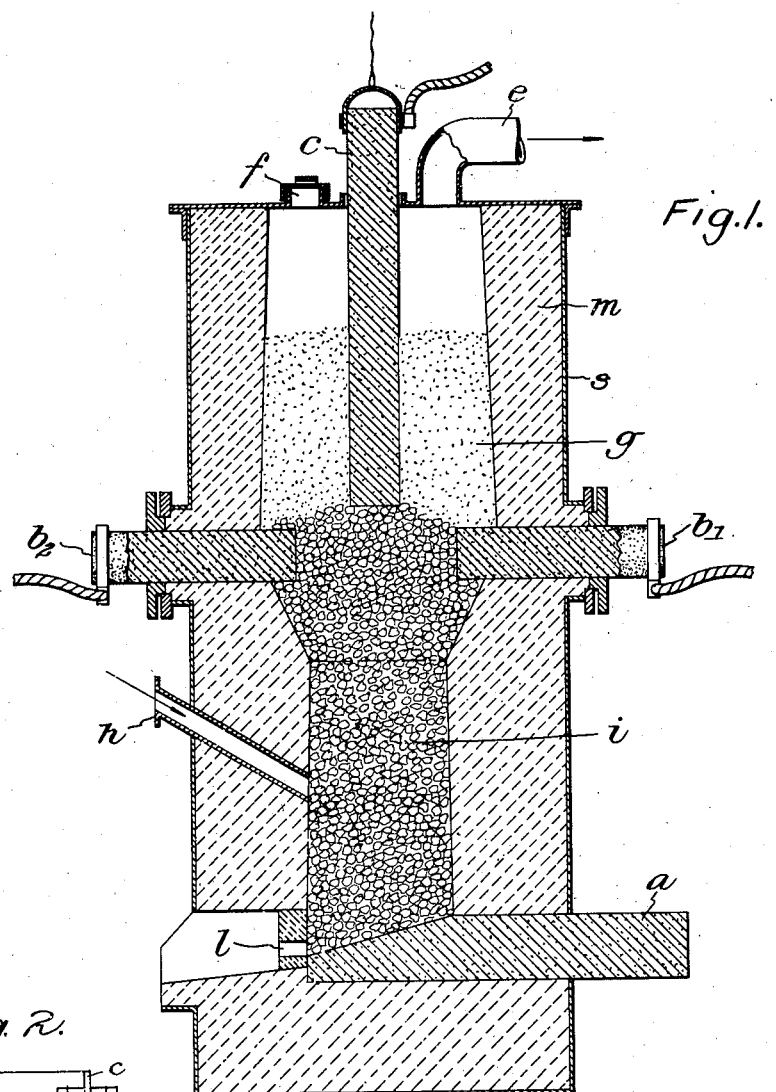

March 14, 1933. W. MOSCHEL 1,901,525
APPARATUS FOR PERFORMING REACTIONS BETWEEN MOLTEN SUBSTANCES AND GASES
Filed Aug. 19, 1931

Inventor:
Wilhelm Moschel,
By Byrnes Townsend & Potter,
Attorneys.

Patented Mar. 14, 1933

1,901,525

UNITED STATES PATENT OFFICE

WILHELM MOSCHEL, OF BITTERFELD, GERMANY, ASSIGNOR, BY MESNE ASSIGNMENTS, TO MAGNESIUM DEVELOPMENT CORPORATION, A CORPORATION OF DELAWARE

APPARATUS FOR PERFORMING REACTIONS BETWEEN MOLTEN SUBSTANCES AND GASES

Application filed August 19, 1931, Serial No. 558,182, and in Germany August 25, 1930.

The present invention relates to improvements in apparatus for performing reactions between molten substances and gases. This application is a continuation in part of my application Ser. No. 499,606, filed December 2, 1930, and entitled "Chlorinating apparatus", the latter being a divisional application of my application Ser. No. 392,462, filed September 13, 1929, and entitled "Process for producing anhydrous magnesium chloride".

In the art of carrying out reactions between liquids and gases it is customary to accelerate and facilitate the reaction by increasing the superficial area of the liquid, for example in irrigation towers or similar apparatus. In the treatment of molten substances having a high melting point, however, this method has hitherto, according to my knowledge, never been employed, since difficulties in preventing solidification of the molten substances during their passage through, with coincident obstruction of, the irrigation tower were anticipated; the art has generally been contented with passing the reagent gasses into the coherent melt.

The difficulty of applying the principle of increasing the superficial area to molten substances having a relatively high melting point is mainly a problem of heat supply regulation. In the case of endothermic or only slightly exothermic reactions, the heat for maintaining the reaction must be supplied, this being a particularly difficult matter when the range of optimum temperature for the reaction is comparatively narrow. Normally, supplying the heat from without is impracticable, since not only a distribution of heat uniformly over the entire reaction zone is hardly possible, but also for reasons connected with the transmission of heat through the walls of the reaction chamber. Good heat conductors such as metals are generally subjected to strong corrosion by molten reaction substances whereas ceramic material is, owing to its low heat conductivity and generally but moderate strength, but a poor substitute. Hence it appears that for carrying out reactions between molten substances and gases internal heating recommends itself from a practical point of view as it renders the question of material comparatively unimportant and at the same time represents an easily regulable and economical mode of supplying heat.

In my copending application Ser. No. 499,606 I have described and claimed an electrically heated apparatus for carrying out reactions of the kind aforementioned, such as chlorinations, said apparatus comprising a closed shaft provided with a fire-proof lining and an irrigation layer of coarse pieces of carbon in the bottom of said shaft. The heating current is supplied by an electrode in the bottom of the shaft in contact with the carbon layer, and by at least one rod-shaped electrode extending from the ceiling into the shaft and also contacting with the carbon layer, and the molten substance to be reacted upon passes downwardly through the electrically heated irrigation layer in countercurrent to the ascending gas.

An object of the present invention is to improve the regulability of said mode of heating so as to allow the improved apparatus to be employed also for a large number of other similar reactions. In so doing I have found it advisable, for considerations of heat economy, not only to arrange for the uniform and easy regulation of the heating of the irrigation layer by the passage of the current through the pieces forming such layer, but also to introduce the charge material to be brought into reaction in liquid form, in the solid state into the furnace above the irrigation layer. So far as heating is concerned this method gives rise to the further problem of effecting in one and the same furnace the preheating of the charge to melting point and supplying the heat required for fusion in a zone above the irrigation layer, while at the same time independently heating the irrigation layer in the manner most suitable for the reaction. In most instances a larger amount of energy will be required for preheating and fusing the charge in the upper portion of the furnace than within the irrigation layer, since in the latter case all that is primarily required, as a general result, is to balance the losses by radiation. In other cases, however, a readily fusible charge material is to be brought into reaction with the ascending gases in the irrigation layer at temperatures substantially higher than the melting point, which necessitates a reversion of the distribution of the heat supply, as compared with the former case. The apparatus described in my copending application Ser. No. 499,606, however, is not sufficiently adaptable to satisfy this two-fold problem.

The apparatus according to the present invention enables the distribution of the admitted electrical energy to be completely adapted to the actual requirements, by suitably disposing a plurality of electrodes in a furnace whose lower portion is provided with irrigation bodies, the current density in different zones of the furnace being governed by the distribution and spacing of the individual electrodes, and if desired also by insertion of resistors in the current leads feeding such electrodes.

Figure 2:
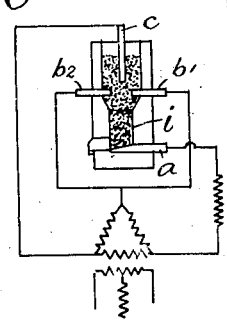

In order more clearly to understand the invention, reference is made to the accompanying drawing, in which Fig. 1 is a diagrammatic illustration, in section, of a suitable embodiment of the invention, and Fig. 2 is a conventional representation of the regulating resistances and the polyphase supply connection.

In said drawing, a shaft $s$ with a lining $m$ of refractory material, is provided with an irrigation stratum $i$ of suitable resistance material, such as carbon, coke, or the like. Current from a three-phase transformer is supplied to said layer by means of the electrodes $a$, $b_1$, $b_2$ and $c$. Electrodes $b_1$ and $b_2$ are connected to the same phase, whilst electrodes $a$ and $c$ are fed, by the other two phases, respectively. The electrodes $b_1$ and $b_2$ are disposed in such a manner that the path of the current to electrode $c$ is shorter than to electrode $a$.

The upper portion of the furnace serves to receive and preheat the charge material $g$. $e$ is a flue for carrying off the gases produced during the reaction, $f$ is a charging mouth, $h$ is a supply pipe for the gaseous components of the reaction, which ascend through the irrigation layer $i$ of the molten components of the reaction, whilst $l$ is a tap hole for drawing off the liquid product of the reaction.

This arrangement of the electrodes enables the distribution of the admitted electrical energy to be completely adapted to the individual conditions of each case. If, for example, a greater amount of energy is to be supplied by the upper portion of the furnace, for preheating and melting the charge material, than is needed in the irrigation layer, the distribution of current in the interior of the furnace can be accurately adjusted to the necessary temperatures by inserting a suitable resistance in the phase connected to the electrode $a$. If, however, the charge consists of readily fusible material, which is to be brought into reaction with the ascending gas, in the irrigation layer, at temperatures substantially above the melting point it is then advisable to dispose both the electrodes $b_1$ and $b_2$ at a somewhat lower level and, by including a resistance in the phase connected to the electrode $c$, ensure that the major portion of the energy is admitted between $a$ and $b_1$ and $b_2$, respectively.

The arrangement of the electrodes may, of course, be varied in other suitable ways. It is, however, a fundamental feature of the hereindescribed arrangement that it affords the possibility of performing reactions between gases and molten substances of largely increased superficial area at high temperatures, without the necessity of electrically insulating the reaction material from the heating units—in contrast, for example, to coke-breeze furnaces,—in which such insulation is invariably effected by a receiving vessel, the reaction material in such receiving vessel thus not serving as a passage for the current. On the other hand, the hereindescribed arrangement differs substantially from the otherwise largely employed electric melting furnaces in that a substance (the irrigation bodies) unconcerned in the reaction, and not the charge material itself, serves to carry the current. It is by this means that, for the first time, the increase in the superficial area of the charge material can be effected concurrently with the heating of said material.

The apparatus of the present invention can be employed for numerous chemical reactions between molten substances and gases. By way of example, mention may be made of the reduction of sodium cyanate to cyanide by the aid of carbon monoxide, or the known transformation of metallic oxides into the corresponding fused anhydrous chlorides, with the aid of chlorine, in presence of reducing agents. Another example, relating to the production of anhydrous sodium sulphide from sodium sulphate, is more fully described below.

*Example*

The reaction material consists of a mixture of 90 parts of sodium sulphate and 10 parts of coke or wood charcoal. This is charged on to the irrigation layer $i$. Owing to the heating of the supporting bed of carbon by the current, the following reaction occurs at the point of contact:

$$Na_2SO_4 + C \rightarrow Na_2SO_3 + CO - 36.8 \text{ cal.} \quad (1)$$

The resulting sodium sulphite fuses very easily and, in association with particles of undecomposed sodium sulphate and carbon, flows down over the irrigation bodies. Concentrated carbon monoxide is admitted into the furnace through the gas branch $h$, whereupon the transformation:

$$Na_2SO_3 + 3CO \rightarrow Na_2S + 3CO_2 - 67.9 \text{ cal.} \quad (2)$$

takes place very quickly, provided the temperature of the irrigation bodies be maintained at 800-900° C.

Both reactions are strongly endothermic. Moreover, for the reaction (1), the heat of fusion must be applied which amounts to about 6 to 7 calories per molecule. Reaction (2), however, is more endothermic and therefore the rapid performance of this reaction requires a still larger supply of heat, which, with the hereindescribed apparatus, is effected by interposing a resistance in front of the electrode $c$, so as to cause a larger proportion of the current to pass between electrodes $a$ and $b_1$, $b_2$.

I claim:

1. Apparatus for carrying out reactions between molten substances and gases comprising a closed shaft, an irrigation layer of electrically conductive material in the lower part of said shaft, an electrode in the vicinity of the bottom of said shaft contacting with said irrigation layer, an electrode extending from the ceiling into the upper part of said shaft into contact with said irrigation layer, and at least one other electrode contacting with the upper part of said irrigation layer.

2. Apparatus for carrying out reactions between molten substances and gases comprising a closed shaft provided with a lining of ceramic material, an irrigation layer of coarse pieces of mechanically resistant and chemically inert carbon in the lower part of said shaft, an electrode in the vicinity of the bottom of said shaft contacting with said irrigation layer, an electrode extending from the ceiling into the upper part of said shaft into contact with said irrigation layer, and at least one other electrode contacting with the uppr part of said irrigation layer.

3. Apparatus for carrying out reactions between molten substances and gases comprising a closed shaft provided with a lining of ceramic material, a tapping hole in the proximity of the bottom of said shaft, at least one gas inlet in the lower part of said shaft, an irrigation layer of coarse pieces of mechanically resistant and chemically inert carbon in the bottom of said shaft extending upwards somewhat beyond said gas inlet, a feeding aperture and a gas outlet in the ceiling of said shaft, an electrode in the vicinity of the bottom of said shaft contacting with said irrigation layer, an electrode extending from the ceiling into the upper part of said shaft into contact with said irrigation layer, and at least one other electrode contacting with the upper part of said irrigation layer.

4. Apparatus for carrying out reactions between molten substances and gases comprising a closed shaft provided with a lining of ceramic material, a tapping hole in the proximity of the bottom of said shaft, at least one gas inlet in the lower part of said shaft, an irrigation layer of coarse pieces of mechanically resistant and chemically inert carbon in the bottom of said shaft extending upwards somewhat beyond said gas inlet, a feeding aperture and a gas outlet in the ceiling of said shaft, an electrode in the vicinity of the bottom of said shaft contacting with said irrigation layer, an electrode extending from the ceiling into the upper part of said shaft into contact with said irrigation layer, at least one other electrode contacting with the upper part of said irrigation layer, current leads leading from without to such electrodes, and resistors, adapted to the actual requirements of current density within the different zones of said shaft, in said current leads.

5. Apparatus for carrying out reactions between molten substances and gases comprising a closed shaft provided with a lining of ceramic material, a tapping hole in the proximity of the bottom of said shaft, at least one gas inlet in the lower part of said shaft, an irrigation layer of coarse pieces of mechanically resistant and chemically inert carbon in the bottom of said shaft extending upwards somewhat beyond said gas inlet, a feeding aperture and a gas outlet in the ceiling of said shaft, an electrode in the vicinity of the bottom of said shaft contacting with said irrigation layer, an electrode extending from the ceiling into the upper part of said shaft into contact with said irrigation layer, at least one other electrode contacting with the upper part of said irrigation layer, current leads leading from without to such electrodes, and resistors, adapted to the actual requirements of current density within the different zones of said shaft, in said current leads, each of said current leads being fed by a separate phase of a polyphase current.

In testimony whereof I have hereunto set my hand.

WILHELM MOSCHEL.